United States Patent
Ponnuru et al.

(10) Patent No.: US 11,256,521 B2
(45) Date of Patent: Feb. 22, 2022

(54) SYSTEMS AND METHODS FOR EVALUATING AND UPDATING DEPRECATED PRODUCTS

(71) Applicant: Dell Products, L.P., Round Rock, TX (US)

(72) Inventors: Viswanath Ponnuru, Bangalore (IN); Raveendra Babu Madala, Bangalore (IN); Vaideeswaran G, Bangalore (IN); Ramesha He, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 89 days.

(21) Appl. No.: 16/773,529

(22) Filed: Jan. 27, 2020

(65) Prior Publication Data

US 2021/0232410 A1 Jul. 29, 2021

(51) Int. Cl.
*G06F 9/44* (2018.01)
*G06F 9/445* (2018.01)

(52) U.S. Cl.
CPC .................. *G06F 9/44505* (2013.01)

(58) Field of Classification Search
CPC .................. G06F 1/32; G06F 1/26; G06F 9/44
See application file for complete search history.

(56) References Cited

U.S. PATENT DOCUMENTS

| | | | | |
|---|---|---|---|---|
| 10,540,202 B1 * | 1/2020 | Smaldone | ............. | G06F 9/4856 |
| 2006/0123016 A1 * | 6/2006 | Ashok | ................ | H04L 41/0803 |
| 2010/0131472 A1 * | 5/2010 | Zlotnick | ................. | G06F 8/72 707/688 |
| 2011/0153559 A1 * | 6/2011 | Rangarajan | ........... | G06F 40/174 707/609 |
| 2014/0033165 A1 * | 1/2014 | Hightower | ................ | G06F 8/36 717/101 |
| 2015/0324181 A1 * | 11/2015 | Segal | ................ | H04W 52/0264 717/178 |
| 2018/0052441 A1 * | 2/2018 | Tanimoto | ............. | G06Q 10/063 |
| 2019/0312946 A1 * | 10/2019 | Chefalas | ................. | H04L 67/10 |
| 2020/0012970 A1 * | 1/2020 | Srivastava | ............. | G06N 20/00 |

* cited by examiner

*Primary Examiner* — Keshab R Pandey
(74) *Attorney, Agent, or Firm* — Fogarty LLP (57) ABSTRACT

Method and systems provide tools for evaluating the impact of component deprecations with a datacenter formed from a plurality of IHSs. Upon receiving a notification of a deprecated component, configuration files that invoke the deprecated component and are in use within the datacenter are identified. Estimates are generated for the resources that would be required to replace references to the deprecated component within the identified configuration files. Estimates may be generated based on compilation errors, test suite failures and historical error repair data. A tree is generated of the dependencies on the deprecated component within the identified configuration files. Based on characteristics of the dependency tree and also based on the resource estimates for replacing references to the deprecated component, a risk level is generated for the deprecated component. The risk level may be generated for individual IHSs, groups of IHSs, or an entire data center.

20 Claims, 3 Drawing Sheets

SYSTEMS AND METHODS FOR EVALUATING AND UPDATING DEPRECATED PRODUCTS

FIELD

The present disclosure generally relates to Information Handling Systems (IHSs), and, more particularly, to the configuration of systems of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Administration of such large groups of IHSs may require teams of remote and local administrators working in shifts in order to support around-the-clock availability of the data center operations while minimizing any downtime. A data center may include a wide variety of hardware systems and software applications that may each be separately licensed and supported. Over time, individual hardware and software systems at use within a data center may become deprecated once those systems are no longer being supported.

SUMMARY

In various embodiments, methods are provided for managing a system comprising a plurality of IHSs (Information Handling Systems). The method may include: receiving a notification of a deprecated component; identifying configuration files invoking the deprecated component, wherein the configuration files are utilized within the plurality of IHSs; estimating resources required for replacing uses of the deprecated component within the identified configuration files; generating a tree of dependencies on the deprecated component; and determining a risk level for the deprecated component based on the dependencies on the deprecated component and further based on the resource estimates for replacing uses of the deprecated component.

In additional method embodiments, the risk level is determined for use of the deprecated component within the plurality of IHSs. In additional embodiments, methods may include replacing references to the deprecated component with updated instructions within the identified configuration files. In additional method embodiments, the resources required for replacing references to the deprecated component are estimated based on compilation errors resulting from the replacement of references to the deprecated component with updated instructions. In additional method embodiments, the resources required for replacing references to the deprecated component are estimated based on results of test routines conducted on the identified configuration files that include the updated instructions. In additional method embodiments, the estimate of resources for replacing references to the deprecated component is determined based on time durations required to repair prior defects in the identified configuration files. In additional method embodiments, the risk level is based on a duration required to sequentially repair all dependencies within a branch of the dependency tree. In additional embodiments, methods may include: determining, based on the generated dependency tree, a sequence for replacing references to the deprecated component within the identified configuration files. In additional method embodiments, the sequence is determined based on sorting branches of the dependency tree based on summations of risk level determinations for branches of the dependency tree.

In various additional embodiments, IHSs (Information Handling Systems) may include: one or more processors; and a memory device coupled to the one or more processors, the memory device storing computer-readable instructions that, upon execution by the one or more processors, cause the IHS to: receive a notification of a deprecated component; identify configuration files invoking the deprecated component, wherein the configuration files are utilized within the plurality of IHSs; estimate resources required for replacing references to the deprecated component within the identified configuration files; generate a tree of dependencies on the deprecated component; and determine a risk level for the deprecated component based on the dependencies on the deprecated component and further based on the resource estimates for replacing references to the deprecated component.

In additional IHS embodiments, execution of the instructions further causes the IHS to replace references to the deprecated component with updated instructions within the identified configuration files. In additional IHS embodiments, the resources required for replacing references to the deprecated component are estimated based on compilation errors resulting from the replacement of references to the deprecated component with updated instructions. In additional IHS embodiments, the resources required for replacing references to the deprecated component are estimated based on results of test routines conducted on the identified configuration files that include the updated instructions. In additional IHS embodiments, the estimate of resources for replacing references to the deprecated component is determined based on time durations required to repair prior defects in the respective configuration files. In additional IHS embodiments, the risk level is based on a duration required to sequentially repair all dependencies within a branch of the dependency tree.

In various additional embodiments, memory devices are coupled to one or more processors, wherein the memory device stores computer-readable instructions that, upon execution by the one or more processors, cause the processors to: receive a notification of a deprecated component; identify configuration files invoking the deprecated component, wherein the configuration files are utilized within the plurality of IHSs; estimate resources required for replacing references to the deprecated component within the identified configuration files; generate a tree of dependencies on the deprecated component; and determine a risk level for the deprecated component based on the dependencies on the deprecated component and further based on the resource estimates for replacing references to the deprecated component.

In additional memory device embodiments, wherein execution of the instructions further causes the processors to replace references to the deprecated component with updated instructions within the identified configuration files. In additional memory device embodiments, the resources required for replacing references to the deprecated component are estimated based on compilation errors resulting from the replacement of references to the deprecated component with updated instructions. In additional memory device embodiments, the resources required for replacing references to the deprecated component are estimated based on results of test routines conducted on the identified configuration files that include the updated instructions. In additional memory device embodiments, execution of the instructions further causes the processors to determine, based on the generated dependency tree, a sequence for replacing references to the deprecated component within the identified configuration files.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

As described, a data center may include a large number of IHSs that may be installed as components of a chassis. A rack may house several different chassis and a data center may include numerous racks. Accordingly, administrators face significant difficulties in assessing the impact of the deprecation of components within the data center. A data center may include a large number of licensed hardware and software systems. Upon deprecation, such data center hardware and software systems are no longer supported by their manufacturer, seller, re-seller or other entity that has been contracted to provide support. In some scenarios, a deprecated system may be rarely used, or only certain features of the deprecated system are actually used. Administrators may be unable to accurately assess the importance of a deprecated system or to identify scenarios where only certain features of a deprecated system are actually used. Embodiments provide capabilities for determining a risk level posed by the deprecation of a hardware and/or software system. Such risk level determinations may be based in part upon the measured use of a deprecated system, such as using measurements that are generated based on usage information collected by IHSs instrumented as described with regard to FIG. 1. A risk level for the deprecation of a particular system may also be indicated based on the dependencies upon the deprecated system that are identified within a data center, or within a computing solution, or within a logical or physical group of IHSs. Some embodiments may further determine a risk level posed by a system deprecation based upon estimates of the resources that would be required to replace use of the deprecated system with a replacement system.

Administrators may utilize a variety of tools in the operation of a data center. For configuration of data center components, administrators may use capabilities by which configuration files are distributed to data center components where they are used in configuring the operations of these data center components. Such configuration files may invoke hardware and software systems that may become deprecated over time. Administrators face significant difficulty in identifying reliance on deprecated systems within such configuration files and face even greater difficulty in assessing the resources and time that may be expected in replacing the reliance on deprecated systems with updated configurations. These difficulties are made greater in the administration of data centers that utilize a large number of configuration files. An IHS may be configured using a variety of configuration files. Additional configuration files may be used in the management of a chassis that houses multiple IHSs.

Figure 1:
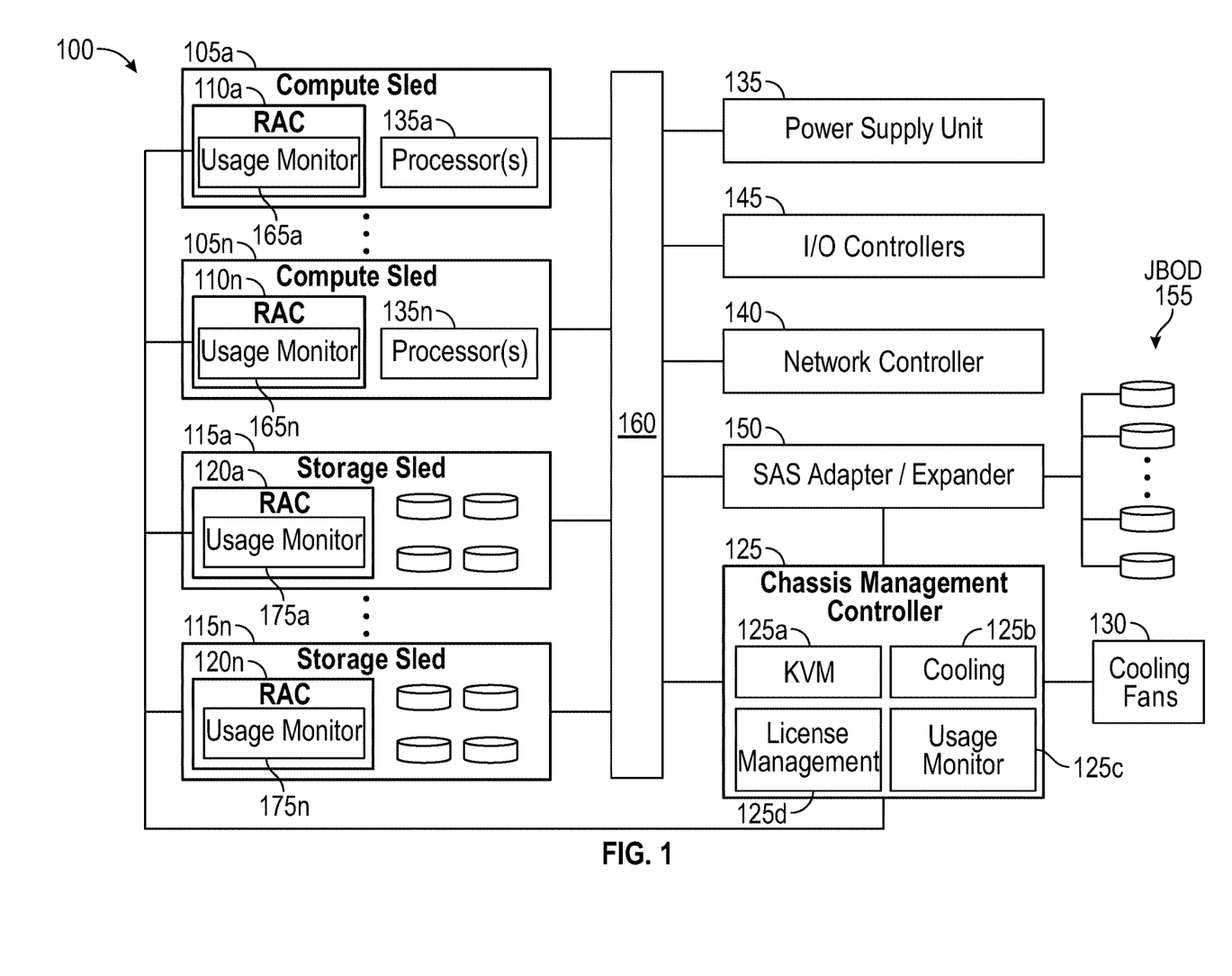
FIG. 1 is a block diagram illustrating certain components of a chassis, configured according to various embodiments, for evaluating and updating deprecated hardware and software components of the chassis.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

By configuring a chassis 100 with different sleds, the chassis may be adapted to support specific types of operations, thus providing a computing solution directed towards a specific type of computational task. For instance, a chassis 100 that is configured to support artificial intelligence computing solutions may include additional compute sleds, compute sleds that include additional processors, and/or compute sleds that include specialized artificial intelligence processors or other specialized artificial intelligence components, such as specialized FPGAs. In another example, a chassis 100 configured to support specific data mining operations may include network controllers 140 that support high-speed couplings with other similarly configured chassis, thus supporting high-throughput, parallel-processing computing solutions. In another example, a chassis 100 configured to support certain database operations may be configured with specific types of storage sleds 115a-n that provide increased storage space or that utilize adaptations that support optimized performance for specific types of databases. In other scenarios, a chassis 100 may be configured to support specific enterprise applications, such as by utilizing compute sleds 105a-n and storage sleds 115a-n that include additional memory resources that support simultaneous use of enterprise applications by multiple remote users. In another example, a chassis 100 may include compute sleds 105a-n and storage sleds 115a-n that support secure and isolated execution spaces for specific types of virtualized environments. In some instances, specific combinations of sleds may comprise a computing solution, such as an artificial intelligence system, that may be licensed and supported as a computing solution comprised of hardware and software systems.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. In some embodiments, components installed on a motherboard backplane 160 may include components that implement all or part of the functions described with regard to components such as the SAS (Serial Attached SCSI) expander 150, I/O controllers 145, network controller 140 and power supply unit 135.

Figure 2:
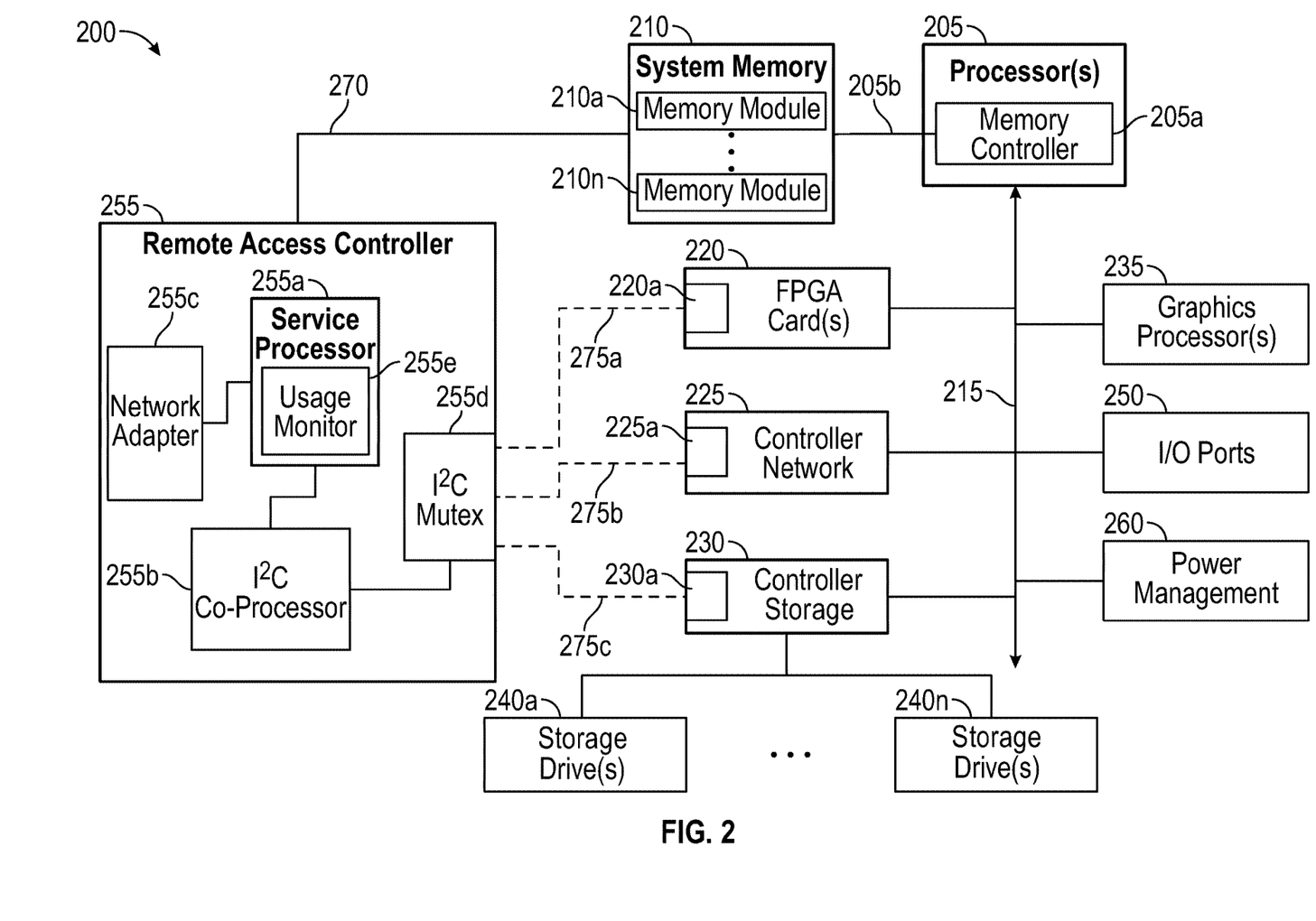
FIG. 2 is a block diagram illustrating certain components of an IHS configured as a component of a chassis, according to various embodiments, for evaluating and updating deprecated hardware and software components of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, in some cases as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks in support of specific computing solutions. A compute sled 105a-n may be a licensed component of a data center and may also operate using various licensed hardware and software systems. As described in additional detail with regard to FIG. 2, a compute sled 105a-n may operate based on configurations specified in one or more files that may include scripts, source code or other instructions that may define both physical and logical configurations of a compute sled 105a-n. For instance, a configuration file for a compute sled 105a-n may specify use of particular storage sleds 115a-n or may specify configurations for one or more virtual machines to be operated by that compute sled.

As illustrated, each compute sled 105a-n includes a remote access controller (RAC) 110a-n. As described in additional detail with regard to FIG. 2, a remote access controller 110a-n provides capabilities for remote monitoring and management of compute sled 105a-n. In support of these monitoring and management functions, remote access controllers 110a-n may utilize both in-band and sideband (i.e., out-of-band) communications with various internal components of a compute sled 105a-n and with other components of chassis 100. Remote access controller 110a-n may collect sensor data, such as temperature sensor readings, from components of the chassis 100 in support of airflow cooling of the chassis 100 and the sleds 105a-n, 115a-n. In some embodiments, remote access controllers 110a-n may support communications with chassis management controller 125 by reporting configuration information and usage data for use in evaluating the impact of the deprecation of a hardware and/or software system relied upon by compute sleds 105a-n, or by the remote access controllers 110a-n. As described in additional detail below, remote access controllers 110a-n may support remote management capabilities in which administrators may provide a remote access controller 110a-n with scripts or other human-readable instructions. Upon being executed by a remote access controller 110a-n, such scripts may support various tasks that provide remote management of compute sleds 105a-n.

A compute sled 105a-n may include one or more processors 135a-n that support specialized computing operations, such as high-speed computing, artificial intelligence processing, database operations, parallel processing, graphics operations, streaming multimedia and/or isolated execution spaces for virtualized environments. Using such specialized processor capabilities of a compute sled 105a-n, a chassis 100 may be adapted for a particular computing solution. As indicated in FIG. 1, a compute sled 105a-n may also include a usage monitor 165a-n. In some embodiments, a usage monitor 165a-n may monitor the use of licensed hardware and/or software capabilities of a respective compute sled 105a-n. The usage data collected by a usage monitor 165a-n may reported to the chassis management controller 125 for use in evaluating the impact of the deprecation of a particular hardware and/or software system and in identifying features of the deprecated system that may be separately supported.

In some embodiments, each compute sled 105a-n may include a storage controller that may be utilized to access storage drives that are accessible via chassis 100. Some of the individual storage controllers may provide support for RAID (Redundant Array of Independent Disks) configurations of logical and physical storage drives, such as storage drives provided by storage sleds 115a-n. In some embodiments, some or all of the individual storage controllers utilized by compute sleds 105a-n may be HBAs (Host Bus Adapters) that provide more limited capabilities in accessing physical storage drives provided via storage sleds 115a-n and/or via a SAS expander 150.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n may include a remote access controller (RAC) 120a-n. Remote access controllers 120a-n may provide capabilities for remote monitoring and management of storage sleds 115a-n in a similar manner to the remote access controllers 110a-n included in compute sleds 105a-n. As with compute sleds 105a-n, the remote access controllers 120a-n of storage sleds 115a-n may also support remote management capabilities in which administrators may provide a remote access controller 120a-n with scripts that support remote management of storage sleds 115a-n.

As described with regard to compute sleds 105a-n, the remote access controller 120a-n of each storage sled 115a-n may include a usage monitor 175a-n used to monitor the use of licensed hardware and/or software systems of a storage sled 105a-n, and may additionally monitor use of certain features of these licensed systems. The usage data collected by the usage monitors 175a-n may be reported to the chassis management controller 125 for use in evaluating the impact of the deprecation of a particular system and in identifying features of that system that may separately supported. In some embodiments, a storage sled 115a-n may operate based on configurations specified in one or more files that may include scripts, source code or other instructions that may define both physical and logical configurations of a storage sled 115a-n. For instance, a configuration file for a storage sled 115a-n may specify a logical grouping with other storage sleds or may specify use of particular storage techniques, such as write-through storage.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located from chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, network controllers 140 may be replaceable components that include capabilities that support certain computing solutions, such as network controllers 140 that interface directly with network controllers from other chassis in support of clustered processing capabilities that utilize resources from multiple chassis. In some embodiments, a network controller 140 may operate based on configurations specified in one or more files that may include scripts, source code or other instructions that may define both physical and logical configurations of network controller 140. For instance, a configuration file for a network controller 140 may specify network bandwidth partitions that are dedicated for use by specific components of chassis 100.

Chassis 100 may also include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In such embodiments, power supply unit 135 is a replaceable component that may be used in support of certain computing solutions.

Chassis 100 may also include various I/O controllers 140 that may support various I/O ports, such as USB ports that may be used to support keyboard and mouse inputs and/or video display capabilities. Such I/O controllers 145 may be utilized by a chassis management controller 125 to support various KVM (Keyboard, Video and Mouse) 125a capabilities that provide administrators with the ability to interface with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

As described, components of chassis 100 such as compute sleds 105a-n and storage sleds 115a-n may include usage monitoring 165a-n, 175a-n capabilities that may collect information regarding the usage of licensed systems and features of those licensed systems. Chassis management controller 125 may similarly include a usage monitor 125c that tracks usage information for some chassis systems that may be licensed. For instance, in some instances, aspects of power supply unit 135 and network controller 140 may utilize licensed software and hardware systems. The usage monitor 125c of the chassis management controller 125 may query such components in collecting usage data regarding licensed features of these components. In some embodiments, a chassis management controller 125 may operate based on configurations specified in one or more files that may include scripts, source code or other human-readable instructions that may define both physical and logical configurations of a chassis management controller 125. For instance, a configuration file for a chassis management controller 125 may specify logical groupings of computer nodes 105a-n or may specify configurations for KVM capabilities.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100 in support of specific computing solutions. As described, such configuration of shared infrastructure resources may be specified in one or more files that may include scripts, source code or other instructions for implementing shared resource configurations.

The IHS 200 of FIG. 2 may be a compute sled, such as compute sleds 105a-n of FIG. 1, that may be installed within a chassis, that may in turn be installed within a rack. Accordingly, IHS 200 may be comprised within a large system of similarly configured IHSs that may be housed within the same chassis, rack and/or datacenter. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one, some or all processor(s) 205 may be graphics processing units (GPUs). In some embodiments, one, some or all processor(s) 205 may be specialized processors, such as artificial intelligence processors or processor adapted to support high-throughput parallel processing computations. As described, such specialized adaptations of IHS 200 may be used to implement specific computing solutions support by the chassis in which IHS 200 is installed.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components. In certain embodiments, the I/O ports 250 may provide couplings to the backplane of the chassis in which the IHS 200 is installed.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. In some embodiments, network controller 225 may collect and report certain usage information to the usage monitor 255e of the remote access controller 255. For example, network controller 225 may collect and report usage data regarding use of the network controller 225, such as the number of a specific type of network operation performed by the network controller 225. As illustrated, network controller 225 may report such usage information to the remote access controller 255 via an out-of-band signaling pathway that is independent of the operating system of the IHS 200. In some embodiments, aspects of network controller 225 may operate based on configurations specified in one or more files that may include scripts, source code or other instructions that may define both physical and logical configurations of network controller 225. For instance, a configuration file for a network controller 225 may specify a networking protocol to be used, such as use of SSL (Secure Socket Layer), or may specify a logging capability.

Processor(s) 205 may also be coupled to a power management unit 260 that may interface with the power system unit 135 of the chassis 100 in which an IHS 200, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGAs 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200. In certain embodiments, such specialized functions supported by an FPGA card 220 may be utilized by IHS 200 in support of certain computing solutions. In such embodiments, the instructions used to program FPGA 220 may be files that may include scripts, source code or other instructions that may define configurations of FPGA 220.

In some embodiments, FPGA 220 may collect and report certain usage information to the usage monitor 255e of the remote access controller 255. For example, an FPGA 220 may collect and report usage data regarding overall use of the FPGA 220, such as the number of operations performed by the FPGA 220 or such as an amount of processing time by FPGA 220. In certain embodiments, FPGA 220 may also track usage data for certain features of the FPGA, such as the number of times a specific capability for which an FPGA has been programmed is actually used. For example, FPGA 220 may collect information regarding use of a specific image processing or artificial intelligence function that is implemented by the FPGA. As illustrated, FPGA 220 may report such usage information to the remote access controller 255 via an out-of-band signaling pathway that is independent of the operating system of the IHS 200.

IHS 200 may also support one or more storage controllers 230 that may be utilized to provide access to virtual storage configurations. For instance, storage controller 230 may provide support for RAID (Redundant Array of Independent Disks) configurations of storage devices 240a-n, such as storage drives provided by storage sleds 115a-n and/or JBOD 155 of FIG. 1. In some embodiments, storage controller 230 may be an HBA (Host Bus Adapter).

In some embodiments, storage controllers 230 may also collect and report certain usage information to the usage monitor 255e of the remote access controller 255. For example, a storage controller 230 may collect and report usage data regarding use of the storage controller 230, such as the number of storage operations performed by the storage controller 230. In certain embodiments, storage controller 230 may also track usage data for specific features of the storage controller's operation. Illustrative examples of such features include the number of times a specific RAID operation has been performed, the number of storage operations involving a particular storage sled or other storage location 240a-n, and the number of operations involving a particular computing solution, such as specific operations in support of a data mining solution. Storage controller 230 may report such usage information to the remote access controller 255 via an out-of-band signaling pathway that is independent of the operating system of the IHS 200. In some embodiments, aspects of storage controller 255 may operate based on configurations specified in one or more files that may include scripts, source code or other instructions that may define both physical and logical configurations of storage controller 255. For instance, a configuration file for a storage controller 255 may specify use of a specific RAID data replication protocol or may limit storage controller 255 to use of a grouping of storage drives 240a-n.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely. As described, in some embodiments, aspects of remote access controller 255 may operate based on configurations specified in one or more files that may include scripts, source code or other instructions. For instance, a configuration file for a remote access controller 255 may specify settings for collection and storage of data by usage monitor 255e or use of a specific networking protocol by network adapter 255c. As described with regard to FIG. 1, IHS 200 may be one of several compute nodes of a chassis. In such cases, an compute node IHS may be configured simultaneously with other compute nodes of a chassis via configuration files that are distributed by a remote management tool or by a management capability of a chassis management controller.

In some embodiments, remote access controller 255 may support monitoring and administration of various devices 220, 225, 230 of an IHS via a sideband interface. In such embodiments, the messages in support of the monitoring and management function may be implemented using MCTP (Management Component Transport Protocol) that may be transmitted using I2C sideband bus connection 275a-c established with each of the respective managed devices 220, 225, 230. As illustrated, the managed hardware components of the IHS 200, such as FPGA cards 220, network controller 225 and storage controller 230, are coupled to the IHS processor(s) 205 via an in-line bus 215, such as a PCIe root complex, that is separate from the I2C sideband bus connection 275a-c.

In certain embodiments, the service processor 255a of remote access controller 255 may rely on an I2C co-processor 255b to implement sideband I2C communications between the remote access controller 255 and managed components 220, 225, 230 of the IHS. The I2C co-processor 255b may be a specialized co-processor or micro-controller that is configured to interface via a sideband I2C bus interface with the managed hardware components 220, 225, 230 of IHS. In some embodiments, the I2C co-processor 255b may be an integrated component of the service processor 255a, such as a peripheral system-on-chip feature that may be provided by the service processor 255a. Each I2C bus 275a-c is illustrated as single line in FIG. 2. However, each I2C bus 275a-c may be comprised of a clock line and data line that couple the remote access controller 255 to I2C endpoints 220a, 225a, 230a.

As illustrated, the I2C co-processor 255b may interface with the individual managed devices 220, 225 and 230 via individual sideband I2C buses 275a-c selected through the operation of an I2C multiplexer 255d. Via switching operations by the I2C multiplexer 255d, a sideband bus connection 275a-c may be established by a direct coupling between the I2C co-processor 255b and an individual managed device 220, 225 or 230.

In providing sideband management capabilities, the I2C co-processor 255b may each interoperate with corresponding endpoint I2C controllers 220a, 225a, 230a that implement the I2C communications of the respective managed devices 220, 225, 230. The endpoint I2C controllers 220a, 225a, 230a may be implemented as a dedicated microcontroller for communicating sideband I2C messages with the remote access controller 255, or endpoint I2C controllers 220a, 225a, 230a may be integrated SoC functions of a processor of the respective managed device endpoints 220, 225, 230.

As described, a compute node such as IHS 200 may include a usage monitor 255e that collects and monitors usage information for hardware and software systems of IHS 200. In some embodiments, a usage monitor 255e may be implemented as a process of remote access controller 255, where the usage data from components 220, 225, 230 may be collected by service processor 255a via the out-of-band management connections 275a-c supported by I2C co-processor 255b. The collected usage data may then be reported to the chassis management controller via a connection supported by the network adapter 255c of the remote access controller 255.

In some embodiments, the usage monitor 255e of remote access controller 255 may periodically query managed components 220, 225, 230 in order to collect usage data from these components. In some embodiments, usage monitor 255e may provide managed components 220, 225, 230 with instructions regarding the data to be collected. In some embodiments, usage monitor 255e may store collected usage data until prompted to provide this data by a chassis management controller or by an administrative process. In some embodiments, a request to provide all or a particular subset of collected usage data may be sent to usage monitor 255e upon notification that a component of the data center has been deprecated, or has been scheduled for deprecation.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
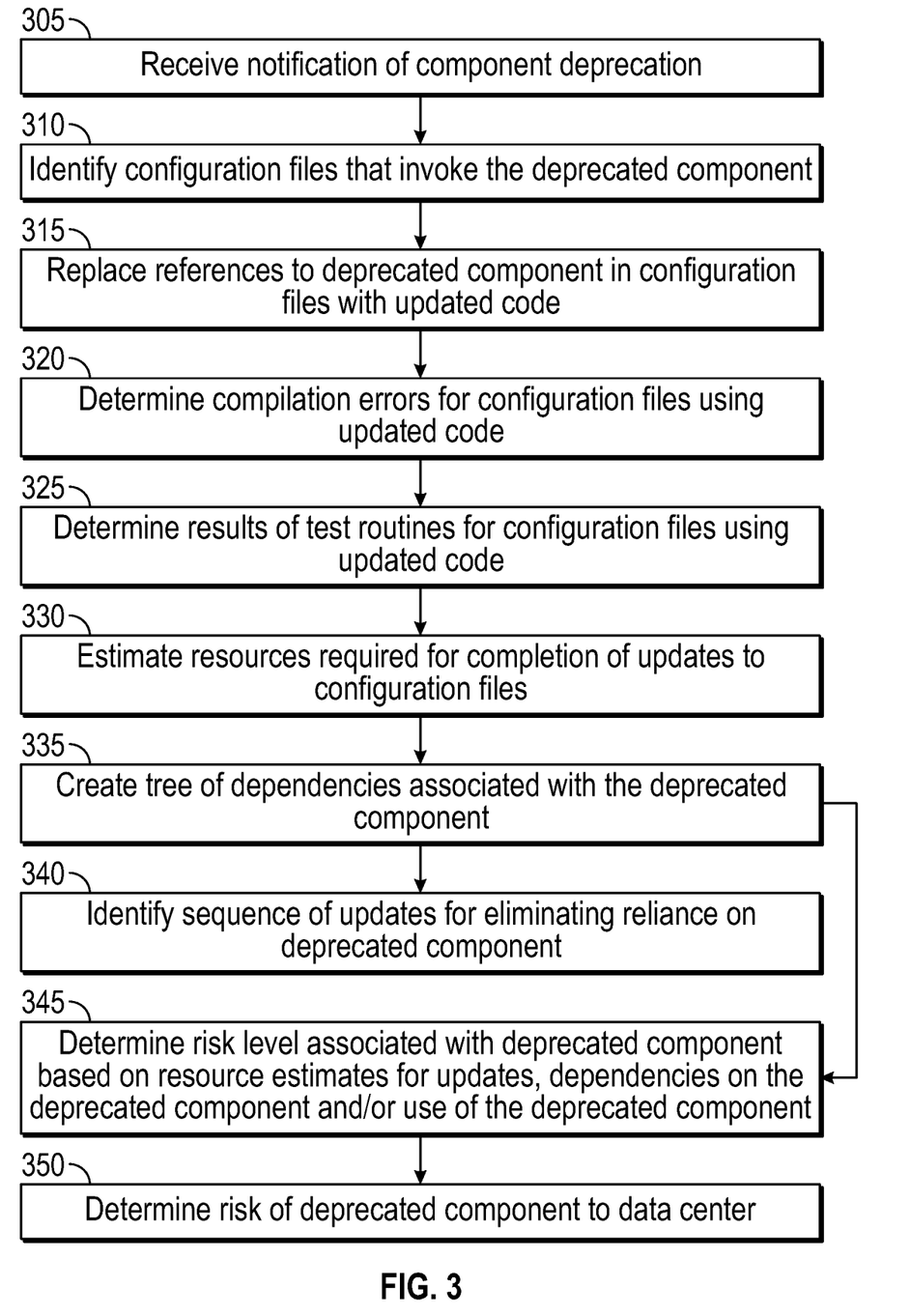
FIG. 3 is a flowchart diagram illustrating certain steps of a process, according to various embodiments, for evaluating and updating deprecated hardware and software components of an enterprise computing system.

FIG. 3 is a flowchart diagram illustrating certain steps of a process, according to various embodiments, for evaluating and updating deprecated hardware and software components of an enterprise computing system. The illustrated embodiment begins at block 305 with the notification of the deprecation of a component that may be operating within a data center. In various scenarios, the deprecated component may be a hardware system, such as a compute sled, storage sled or an FPGA or storage controller that is installed within a compute sled. In other scenarios, a deprecated component may be a software system, such as a database application, a security protocol or a remote management protocol. In other scenarios, a deprecated component may be a computing solution that may include both hardware and software elements, such as an e-commerce or artificial intelligence system. In some scenarios, the notification of the deprecation of a component may be received by an administrative tool in use by a datacenter. In scenarios where a deprecation is forthcoming, the notification may specify a date by which the deprecation will become effective.

As described, various components of an IHS and of a chassis operating within a data center may be configured using one or more files that specify instructions for the configuration of hardware and software elements of these components. In some instances, such configuration files may include instructions that invoke a deprecated hardware or software system. For instance, a configuration file in use by a storage controller may invoke a software routine used to replicate data across multiple storage drives. Such a data replication routine may be deprecated for various reasons, such as based on availability of a more efficient replication routine, due to discovery of a security flaw in the replication routine, or due to lack of use of the replication routine. In another example, a configuration file in use by a network controller may specify a partitioning of available network bandwidth and apportionment of the partitions for use by specific storage sleds within a chassis. Such network partitioning may be implemented via instructions included within configuration files. Deprecation of such as a network portioning technique may require replacing these instructions with updated instructions that invoke a new partitioning technique. Other configuration files in use by a remote management controller may generates report the provide status information on various capabilities of an IHS. A chassis management controller may utilize configuration files for managing the configuration of multiple IHSs, such as compute nodes, supported by a chassis. In some embodiments, data center administration tools may provide management of multiple chassis configured as part of computing solution through the use of configuration files that may issue commands to each of the chassis management controllers. In some embodiments, enterprise administrative tools may provide another layer of management capabilities that likewise utilize configuration files that may be executed to issued commands to multiple data center administration tools in the management of enterprise computation tasks, such as configuring use of cloud computing resources to support an e-commerce application.

At block 310, procedures may be initiated for evaluating the cost required for replacing use of a deprecated component, specifically with regard to replacing the invocations of deprecated systems within the configuration files in use within one or more data centers. Once a deprecated system has been specified, embodiments may identify all instances of the deprecated system within the configuration files in use within one or more data centers, or within a portion of a single data center. In many instances, the notification of the deprecation of a system may be accompanied by a notification of a replacement system. For instance, configuration files may invoke use a status monitoring capability that has provided by a legacy data center tool. Upon deprecation of the legacy data center tool, that same status monitoring capability now may be supported by a new data center tool. Accordingly, continued use of the reporting capability requires updating all references to the deprecated data monitoring tool with invocations of the same data monitoring capability of the new data monitoring tool. In some instances, a replacement system may be manually determined. At block 315, a branch of a configuration file repository may be made and the identified configuration files that invoke the deprecated system may be automatically edited to instead invoke the replacement system.

Using the edited configuration files of the branched repository, at block 320, the updated configuration files may be compiled, or interpreted in the case of some scripted configuration files. The compilation process may result in various types of errors and warnings. Based on the number and types of errors and warnings that are generated, estimates may be generated for the time required to address these compilation issues. Certain types of syntax errors, for instance, may be addressed without significant resources. Other types of errors, such as incorrect use of types in functions parameters, may require significantly more resource to diagnose and repair. In some embodiments, estimates for addressing compilation errors may be generated based on analysis of past defects associated with the affected portions of a configuration file. For instance, past defects associated with the portion of the configuration file may be evaluated to generate the time required to fix these prior defects. In some instances, such determinations may be generated, at least in part, by calculating a duration between the time a prior defect was submitted and the time of resolution of that defect. In some instances, evaluation of multiple relevant defects may be used to generate worst-case and best-case estimates for the time required to address a particular compilation error.

In order to identify run-time errors and test various aspects of the operation of the configuration files, at block 325, a series of test routines may be run on the updated configuration files. As with the compilation process, the results of the test routines may provide an indication of the time required to ready the updated configuration files for error-free operation. Based on the number and type of test routines errors that are identified, additional estimates may be generated for the time to address these test routine issues. As with the compilation errors, worst-case and best-case estimates for addressing test routine issues may be generated based on available debug information. At step 330, the estimate for the resources required to address the errors identified in the compilation of the updated configuration files are added to the estimate for the resources required to address the test routine errors for the updated configuration files. The resulting estimate may specify a time duration and/or number of man-hours that would be required to upgrade the configuration files to replace use of the deprecated system with use of a replacement system.

In determining a risk level associated with the deprecation of a system at use within one or more datacenters, at block 335, a dependency tree may be generated that identifies the data center systems that depend on the deprecated component, either directly or indirectly. The dependency tree may then be evaluated to generate a metric describing the degree of dependence on the deprecated system within a chassis, a group of IHSs, a data center or a group of data centers. For instance, the dependency tree associated with a deprecated system may include numerous different branches, thus reflecting several different components using the deprecated system. In another scenario, a dependency tree may include fewer branches, but each branch may include numerous nodes in each branch, thus reflecting numerous systems depending on deprecated systems. In some instances, each level of a dependency tree may correspond to layers of administrative tools at use within a data center environment. Leaf nodes of a dependency tree may correspond to the tools used to configure a single IHS, such as the tools described with regard to FIGS. 1 and 2 that may execute provided configuration files. A subsequent layer of dependency tree nodes may correspond to tools that operate on multiple IHSs, such as operations specified in configuration files utilized by chassis management controllers. The following layer of dependency tree nodes may correspond to tools that operate multiple chassis, such as a data center tool that uses configuration files to distribute new network information for use by the various chassis that are included in the data center. A final layer of dependency tree nodes may correspond to enterprise-level tools that operate across data centers in support of a computing solution, such as use of configuration files for provisioning a cloud-based application to support a secure messaging network.

As described, in some instances, a notification of a component deprecation may be accompanied by a date by which the deprecation will be effective. In such instances, a risk level associated with a component deprecation may be based in part upon evaluation of the time required to upgrade affected configuration files prior to the effective date of the component deprecation. In some embodiments, the time required to upgrade the affected configuration files may be generated using the generated dependency tree. For example, the time required to update a configuration file dependency on a deprecated system may be based on the aggregate time required to address all dependencies with a branch of the dependency tree or instead based on the aggregate time required to address all dependencies at the same level of the dependency tree. Such estimates may provide worst-case time estimates for addressing a dependency, while best-case estimates may be generated based on the time required to address only an individual dependency. Based on such estimates, a risk level may be generated that represents the ability to address dependencies on a deprecated component within the configuration files prior to the effective date of the deprecation.

In some embodiments, at block 340, the dependency tree may be used to determine a sequence for replacing the use of the deprecated system within the configuration files. In some instances, the sequence of updates may begin with updating references to a deprecated system within the longest branches of the dependency tree. In other instances, the branches of a dependency tree may be sorted based on the risk level associated with each branch. As described below, risk levels at each node in a branch of dependency tree may be weighted based on the level of a node within the dependency tree. A generated sequence for updates may direct updates in branches associated with the highest risk level. In such cases, the sequence of updates may specify a depth-first traversal of these branches of the dependency tree that have been sorted based on risk level. In some instances, the differences in risk level between branches may be minimal such that a breadth-first traversal of the dependency tree may result in addressing similar dependencies present at each level of the dependency tree.

At block 345, an overall risk level may be determined for a deprecated component, where the risk level may characterize the importance of a deprecated component and may also characterize the resources required to replace use of the deprecated component with use of a replacement component. As described, the risk level associated with a deprecated component may be based at least in part upon the resources required to update the configuration files to use of a replacement system. Embodiments may estimate time and labor resources that would be required to address compilation and test suite errors caused by automated replacement of references to a deprecated component within the configuration files. The greater the resources that would be required to update references to a deprecated component, the greater the risk level associated with that deprecated component. As described, this risk level may also give consideration to the ability to update the configuration files prior to a provided effective date for the component deprecation.

In some embodiments, the risk level associated with a deprecated component may be further based on the identified dependencies on the deprecated component. As described, a dependency tree may indicate the number and type of dependencies that exist on a deprecated component with the data center. The greater the number of systems that depend on a deprecated system, the greater the risk level associated with a deprecated system. In various embodiments, both the depth and breadth of the dependency tree may be evaluated in determining a risk level for a deprecated system.

As described, IHSs and chassis according to embodiments may include usage monitors that collect data that measuring the actual use of some of the components of the IHS and/or chassis. For instance, a usage monitor of an IHS may track the actual use of a storage controller, as well as use of some of the features of the storage controller. Accordingly, a risk level associated with a deprecated component may be further based on measured use of that component, or features of the deprecated component. Even if replacement of references to a deprecated component is deemed to require significant amount of resources, the risk level posed by such a deprecation may be relatively low if the deprecated component is not used. Similarly, a dependency tree may indicate minimal dependencies on a deprecated component, but the risk level associated with this deprecation may be relatively high in scenarios where collected usage data indicates this component is heavily used.

In some embodiments, at block 350, the risk level for the deprecated component may be determined with respect to a datacenter, or to groups of IHSs within the datacenter. For instance, in some scenarios, a deprecated component may be located only within a small number of IHSs within a data center. In such instances, the risk level associated with a deprecated component may be relatively low to the data center, but may relatively high for individual IHSs that rely significantly on the deprecated component. In some instances, a risk level to a data center may be comprised of weighted risk levels at each level of a dependency tree generated for a component deprecation. For instance, the risk for a deprecation associated with a leaf-node of a dependency tree (e.g., configuration file tools operated by a remote management controller in management of a single IHS) may be weighted less than a risk originating in a subsequent layer of the dependency tree (e.g., configuration file tools operated by a chassis management controller in management of multiple IHSs), which may in turn be weighed less than a risk originating from a subsequent layer of the dependency tree (e.g., configuration file operations by enterprise tools that manage operations that may span multiple data centers).

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing a system comprising a plurality of IHSs (Information Handling Systems), the method comprising:
monitoring usage of a plurality of instances of a component installed in each of the plurality of IHSs, wherein the usage is monitored through a sideband management connection between a respective component and a remote access controller of each of the plurality of IHSs;
receiving a notification of a deprecation of the component;
identifying configuration files invoking the deprecated component, wherein the configuration files are utilized within the plurality of IHSs;
estimating resources required for replacing uses of the deprecated component within the identified configuration files;
generating a tree of dependencies on the deprecated component; and
determining a risk level for the deprecated component based on the dependencies on the deprecated component and further based on the resource estimates for replacing uses of the deprecated component, and further based on the monitored usage for the deprecated component.

2. The method of claim 1, wherein the deprecated component comprises a storage controller, and wherein monitored usage of storage controller instances within the plurality of IHSs comprises monitoring a number of a RAID operation performed by the storage controller.

3. The method of claim 1, further comprising:
replacing references to the deprecated component with updated instructions within the identified configuration files.

4. The method of claim 3, wherein the resources required for replacing references to the deprecated component are estimated based on compilation errors resulting from the replacement of references to the deprecated component with updated instructions.

5. The method of claim 4, wherein the resources required for replacing references to the deprecated component are estimated based on results of test routines conducted on the identified configuration files that include the updated instructions.

6. The method of claim 1, wherein the estimate of resources for replacing references to the deprecated component is determined based on time durations required to repair prior defects in the identified configuration files.

7. The method of claim 1, wherein the risk level is based on a duration required to sequentially repair all dependencies within a branch of the dependency tree.

8. The method of claim 1, further comprising:
determining, based on the generated dependency tree, a sequence for replacing references to the deprecated component within the identified configuration files.

9. The method of claim 8, wherein the sequence is determined based on sorting branches of the dependency tree based on summations of risk level determinations for branches of the dependency tree.

10. A system, comprising:
a plurality of managed IHSs, wherein each of the managed IHSs comprises a remote access controller that monitors usage data for components of a respective IHS via a sideband management connection with the monitored component;
an IHS comprising:
one or more processors; and
a memory device coupled to the one or more processors, the memory device storing computer-readable instructions that, upon execution by the one or more processors, cause the IHS to:
receive a notification of a deprecated component;
identify configuration files invoking the deprecated component, wherein the configuration files are utilized within the plurality of IHSs;
estimate resources required for replacing references to the deprecated component within the identified configuration files;
generate a tree of dependencies on the deprecated component; and
determine a risk level for the deprecated component based on the dependencies on the deprecated component and further based on the resource estimates for replacing references to the deprecated component, and further based on the monitored usage for the deprecated component as provided by the respective remote access controllers of the managed IHSs that include an instance of the deprecated component.

11. The IHS of claim 10, wherein execution of the instructions further causes the IHS to replace references to the deprecated component with updated instructions within the identified configuration files.

12. The IHS of claim 11, wherein the resources required for replacing references to the deprecated component are estimated based on compilation errors resulting from the replacement of references to the deprecated component with updated instructions.

13. The IHS of claim 12, wherein the resources required for replacing references to the deprecated component are estimated based on results of test routines conducted on the identified configuration files that include the updated instructions.

14. The IHS of claim 10, wherein the estimate of resources for replacing references to the deprecated component is determined based on time durations required to repair prior defects in the respective configuration files.

15. The IHS of claim 10, wherein the risk level is based on a duration required to sequentially repair all dependencies within a branch of the dependency tree.

16. A first memory device and a second memory device, wherein the first memory device is comprised within a remote access controller of a managed IHS, and wherein first memory device stores computer-readable instructions that, upon execution by a processor of the remote access controller, cause the processor of the remote access controller to: monitor usage of components installed in the managed IHS through a sideband management connection between a respective component and the remote access controller, and wherein the second memory device is coupled to one or more processors of an IHS, wherein the memory device stores computer-readable instructions that, upon execution by the one or more processors, cause the processors to:
receive a notification of a deprecated component;
identify configuration files invoking the deprecated component, wherein the configuration files are utilized within the plurality of IHSs;
estimate resources required for replacing references to the deprecated component within the identified configuration files;
generate a tree of dependencies on the deprecated component; and determine a risk level for the deprecated component based on the dependencies on the deprecated component and further based on the resource estimates for replacing references to the deprecated component, and further based on the monitored usage for the deprecated component as provided by the remote access controller of the managed IHS.

17. The memory device of claim 16, wherein execution of the instructions further causes the processors to replace references to the deprecated component with updated instructions within the identified configuration files.

18. The memory device of claim 17, wherein the resources required for replacing references to the deprecated component are estimated based on compilation errors resulting from the replacement of references to the deprecated component with updated instructions.

19. The memory device of claim 18, wherein the resources required for replacing references to the deprecated component are estimated based on results of test routines conducted on the identified configuration files that include the updated instructions.

20. The memory device of claim 16, wherein execution of the instructions further causes the processors to determine, based on the generated dependency tree, a sequence for replacing references to the deprecated component within the identified configuration files.

\* \* \* \* \*